US009601748B2

(12) United States Patent
Haag

(10) Patent No.: US 9,601,748 B2
(45) Date of Patent: Mar. 21, 2017

(54) HIGH ENERGY DENSITY ENERGY STORAGE AND DISCHARGE DEVICE

(75) Inventor: Michael Haag, Denver, CO (US)

(73) Assignee: MSMH, LLC, Des Plaines, IL (US)

( * ) Notice: Subject to any disclaimer, the term of this patent is extended or adjusted under 35 U.S.C. 154(b) by 193 days.

(21) Appl. No.: 13/306,331

(22) Filed: Nov. 29, 2011

(65) Prior Publication Data
US 2012/0299445 A1 Nov. 29, 2012

Related U.S. Application Data

(60) Provisional application No. 61/550,893, filed on Oct. 24, 2011, provisional application No. 61/495,626, filed on Jun. 10, 2011, provisional application No. 61/418,232, filed on Nov. 30, 2010.

(51) Int. Cl.
H01M 4/04 (2006.01)
H01M 4/13 (2010.01)
H01M 4/134 (2010.01)
H01M 4/1395 (2010.01)
H01M 4/38 (2006.01)
H01M 4/46 (2006.01)
H01M 10/052 (2010.01)

(52) U.S. Cl.
CPC ......... *H01M 4/0457* (2013.01); *H01M 4/134* (2013.01); *H01M 4/1395* (2013.01); *H01M 4/38* (2013.01); *H01M 4/463* (2013.01); *H01M 10/052* (2013.01); *Y02E 60/122* (2013.01); *Y10S 977/773* (2013.01)

(58) Field of Classification Search
CPC .. H01M 4/0457; H01M 4/132; H01M 4/1395; H01M 4/38; H01M 4/463
USPC ...................................................... 310/339
See application file for complete search history.

(56) References Cited

U.S. PATENT DOCUMENTS

| 2005/0272214 | A1 | 12/2005 | Chiang et al. |
| 2008/0041446 | A1* | 2/2008 | Wu et al. ............... 136/263 |
| 2008/0067618 | A1* | 3/2008 | Wang et al. ............. 257/415 |
| 2008/0254362 | A1 | 10/2008 | Raffaelle et al. |
| 2009/0114275 | A1 | 5/2009 | Zaban et al. |
| 2009/0205181 | A1 | 8/2009 | Koizumi et al. |
| 2010/0148144 | A1 | 6/2010 | Britton et al. |

(Continued)

FOREIGN PATENT DOCUMENTS

| EP | 2091091 A2 | 8/2009 |
| WO | 2007015250 A2 | 2/2007 |

OTHER PUBLICATIONS

European Patent Office, "Extended European Search Report mailed Jun. 24, 2014", European Patent Application No. 11844514.7, 7 Pages.

(Continued)

Primary Examiner — Derek Rosenau
(74) Attorney, Agent, or Firm — Dorsey & Whitney LLP

(57) ABSTRACT

An electrically transductive device, including a substrate having an electrically conducting surface portion, a first film of semiconducting nanoparticles positioned on the electrically conducting portion and further including a first plurality of close packed first generally spherical particles defining a first plurality of interstices and a second plurality of second, smaller generally spherical particles substantially filling the plurality of interstices, and a first coating of electrically conductive metal deposited over the first film.

23 Claims, 16 Drawing Sheets

(56) References Cited

U.S. PATENT DOCUMENTS

2010/0231095 A1* 9/2010 Kubota et al. ............... 310/357
2011/0049415 A1* 3/2011 Lee et al. ..................... 252/74
2011/0163636 A1* 7/2011 Sirbuly et al. ............... 310/339

OTHER PUBLICATIONS

Korean Patent Office, "Notice of Preliminary Rejection dated Aug. 28, 2014", Korean Patent Application No. 10-2013-7017241 with English Translation, 7 Pages.

* cited by examiner

HIGH ENERGY DENSITY ENERGY STORAGE AND DISCHARGE DEVICE

CROSS-REFERENCE TO RELATED APPLICATIONS

This patent application claims priority to U.S. provisional patent application Ser. No. 61/550,893, filed on Oct. 24, 2011; copending U.S. provisional patent application Ser. No. 61/495,626, filed on Jun. 10, 2011; and to copending U.S. provisional patent application Ser. No. 61/418,232, filed on Nov. 30, 2010.

BACKGROUND

Electrophoretic deposition is a process by which particles desired to be plated or deposited onto a substrate are first colloidally suspended and then urged out of suspension and onto a substrate by means of an applied electric field. The desired coating material is provided as an amount of colloidal particles suspended in a liquid (typically aqueous) medium. The particles are imparted a surface charge, and thus migrate under the influence of an applied electric field to be deposited onto a charged substrate, which acts as an electrode. The colloidal particles can be polymeric, metallic or ceramic, so long as they can hold a surface charge.

Electrophoretic deposition may be used for applying charged colloidal materials to any substrate that is, or that can be made, electrically conductive. Aqueous colloidal suspensions are typical of electrophoretic deposition. Nonaqueous electrophoretic deposition applications are being explored, but are still in their infancy and are primarily attractive for applications requiring voltages high enough to electrolyze water, which may result in the evolution of undesired amounts of oxygen.

Electrophoretic deposition is typically used to apply coatings to metallic items, such as machine parts, metallic structural members, containers, and the like. Current manufacturing methods for deposition of thin films onto substrates, such as silicon films for photovoltaic applications, typically utilize a vacuum environment in order to lower the crystallization temperatures of the amorphous silicon material used as a silicon source and deposited onto the substrate for subsequent heating and recrystallization. However, the electrophoretic deposition process is more difficult to control as the size of the suspended particles decreases. As coatings made up of smaller, nanoscale particles having interesting and useful properties are desired, there thus arises a need to an improved electrophoretic deposition process for providing such coatings. The present novel technology addresses this need.

SUMMARY

The novel technology relates to an amplified piezoelectric effect resulting from quantum confined silicon and germanium nanocrystals synthesized in a predetermined state of stress. The nanoscale piezoelectric effect may be amplified by nanoparticles having a crystalline core surrounded by an amorphous shell and/or a crystalline core coated by a chemically different material, crystalline or amorphous. The increase to the nanoscale piezoelectric effect arises from higher relative strain induced at the interface of the coreshell nanoparticles from the difference in coefficient of thermal expansion between the amorphous shell and the crystal core and/or from the mismatch of interatomic spacing between the vitreous shell and crystal core. Typically, the shell compresses the core, but may alternately contribute tensile stresses. Particles are deposited onto a conductive substrate by electrophoretic deposition and self-align according to their respective dipole moments to form a unified Weiss domain throughout the film. Internal stress in the particles making up the film can be increased by intercalation of smaller atoms, such as lithium. Lithium intercalation into the nanocrystals results in a further increase in internal stress and a subsequent increase in the energy density achievable within the film. Typically, a metal film is deposited to protect the nanoparticle film. The metal contact also serves as a conduit for transferring energy stored in the film to an external device.

One object of the present novel technology is to provide an improved high energy density power storage and discharge device. Related objects and advantages of the present novel technology will be apparent from the following description.

DETAILED DESCRIPTION OF THE PREFERRED EMBODIMENTS

Figure 1A:
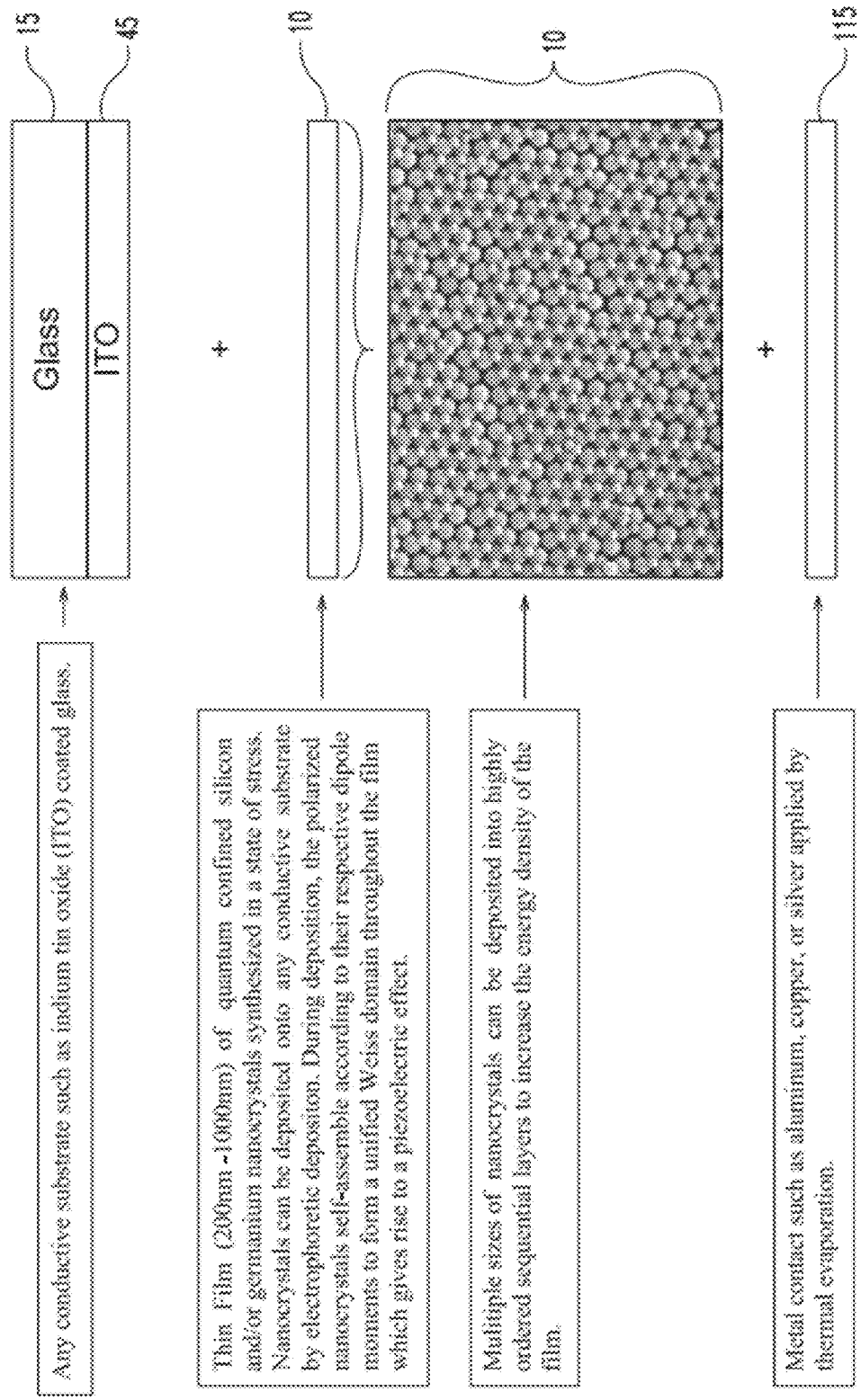
FIG. 1A is an exploded view of a semiconducting nanocrystalline film deposited on a conductive substrate according to a first embodiment of the present novel technology.
Figure 1B:
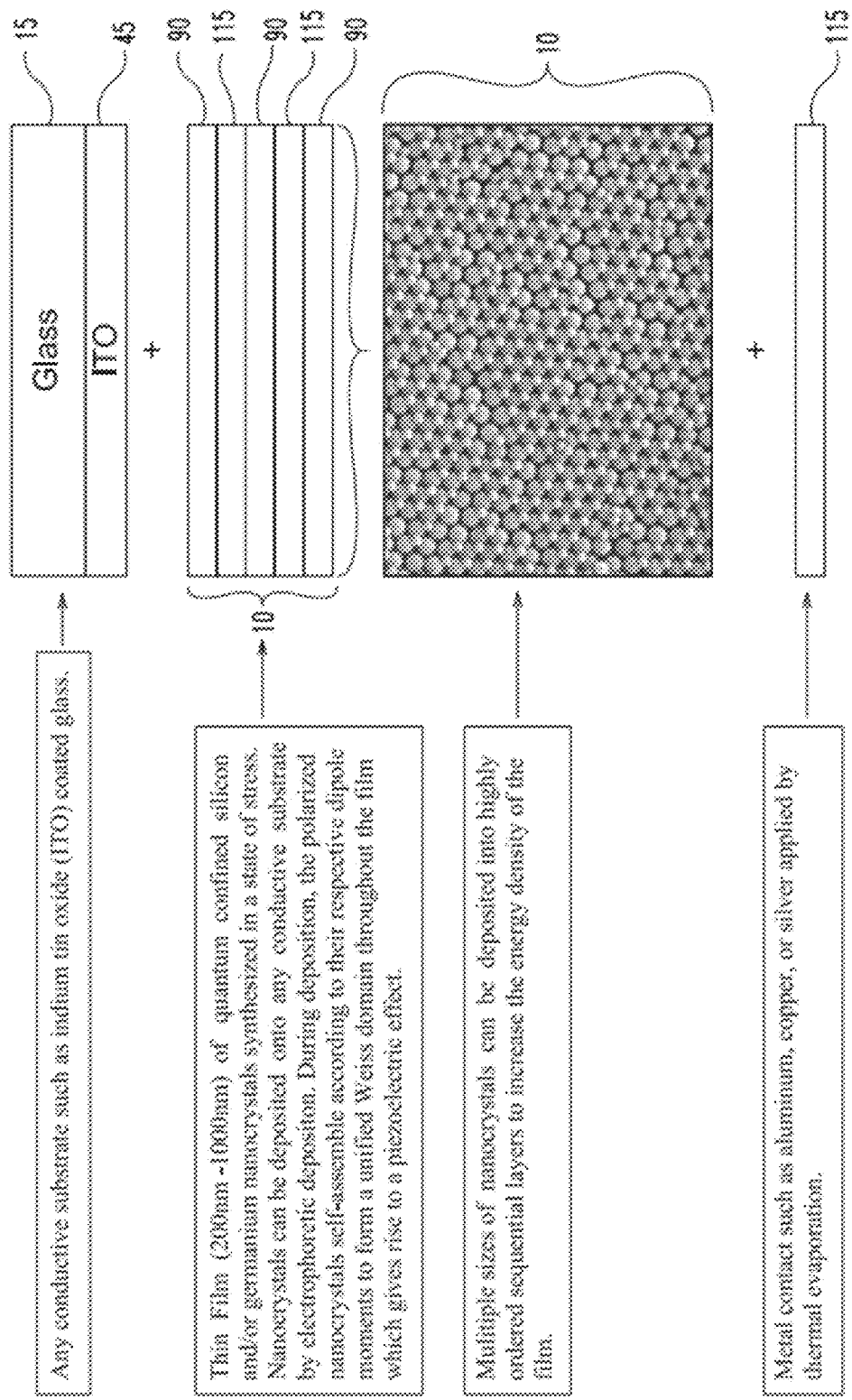
FIG. 1B is an exploded view of a plurality of semiconducting nanocrystalline films separated by electrically conducting layers as deposited on a conductive substrate according to a second embodiment of the present novel technology.
Figure 2:
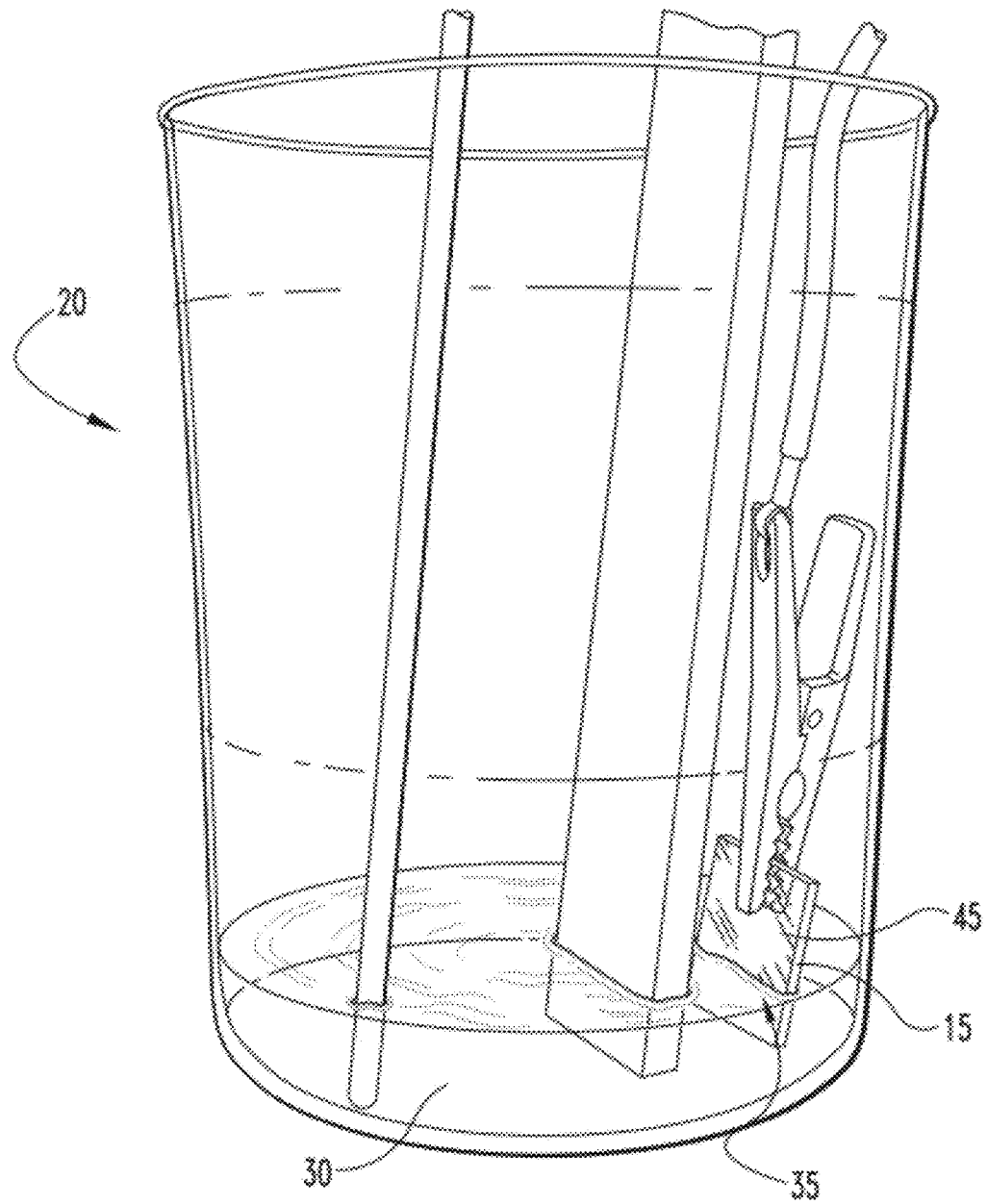
FIG. 2 is a perspective view of an assembly for depositing the film of FIG. 1 onto a substrate.
Figure 3:
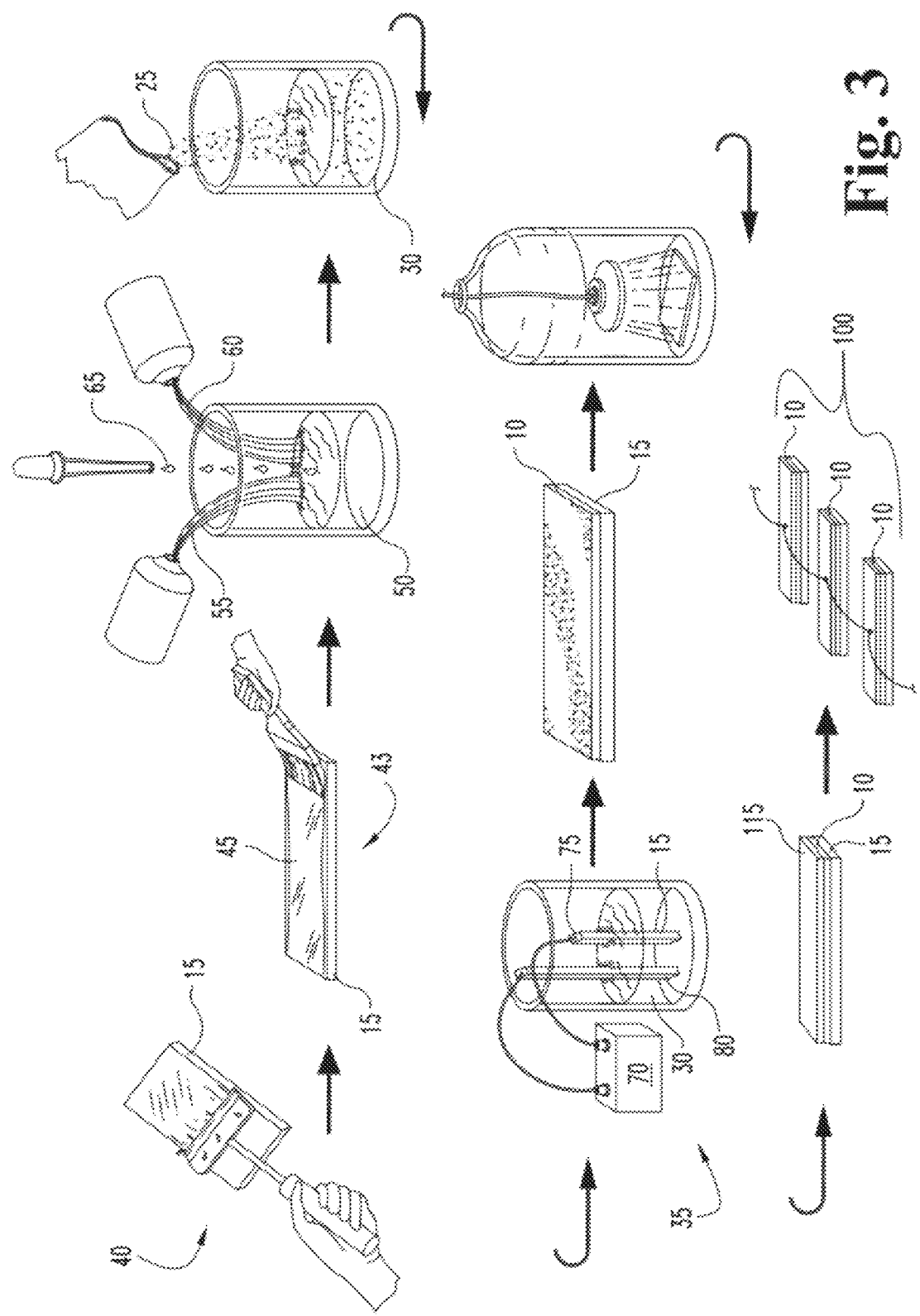
FIG. 3 is a process chart illustrating the fabrication of one or more devices according to the embodiment of FIG. 1.
Figure 4:
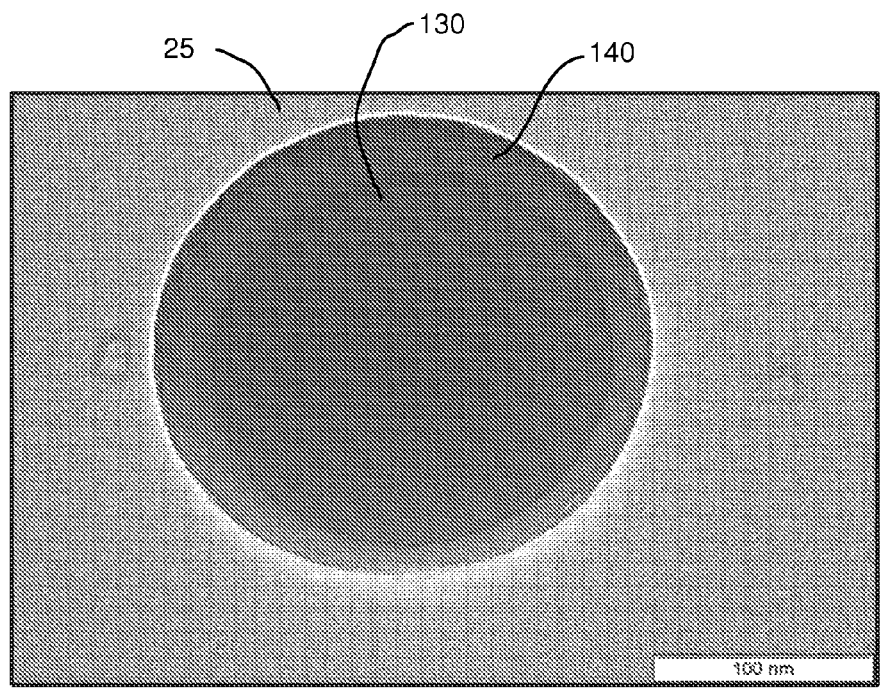
FIG. 4 is a TEM photomicrograph perspective view of a strained silicon nanocrystal having an amorphous silicon shell encapsulating a purified crystalline silicon core.
Figure 5:
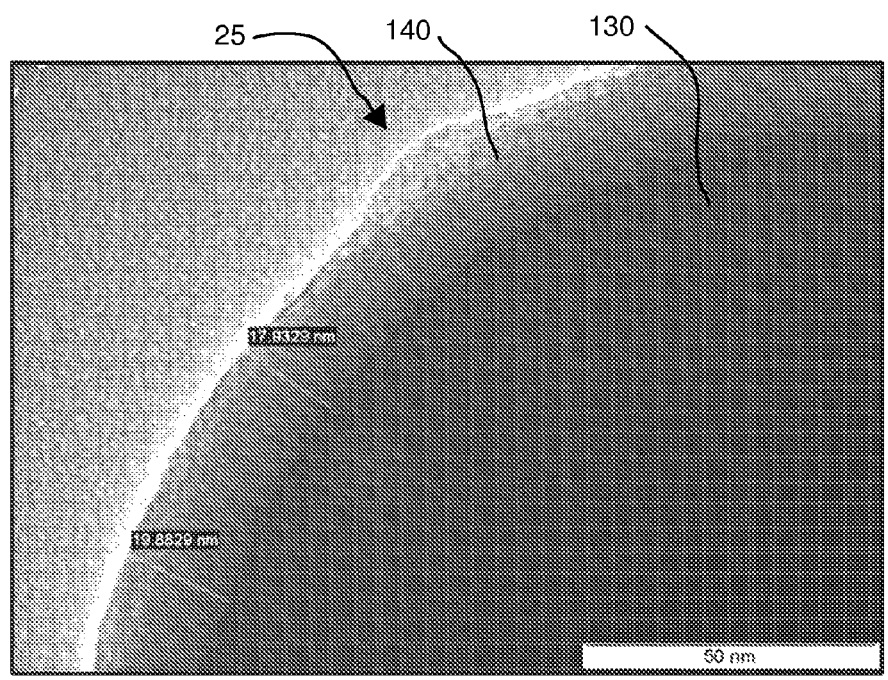
FIG. 5 is an enlarged TEM photomicrograph view of a portion of the crystal of FIG. 4.
Figure 6:
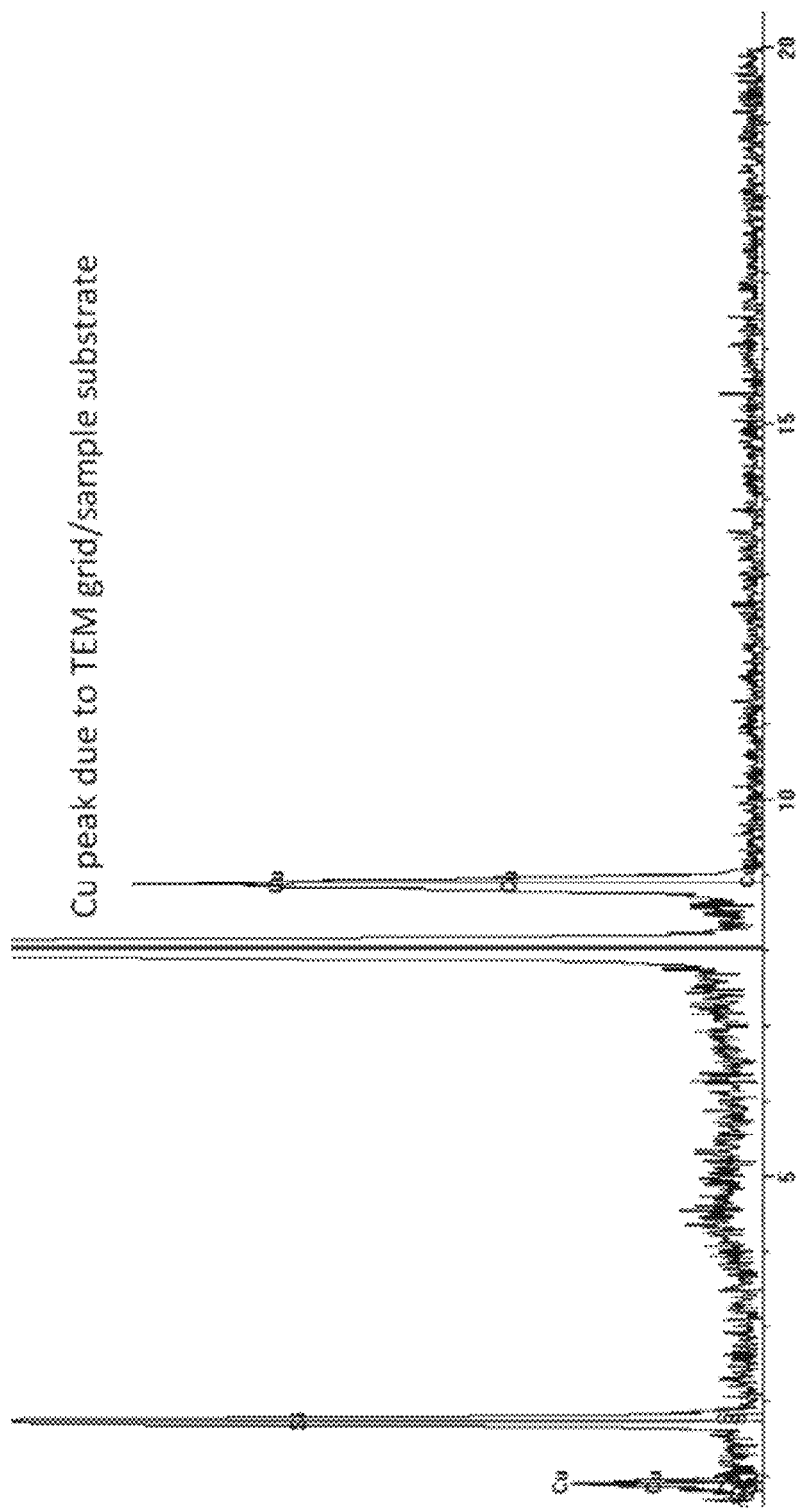
FIG. 6 graphically illustrates an EDX plot for the crystal of FIG. 4.
Figure 7A:
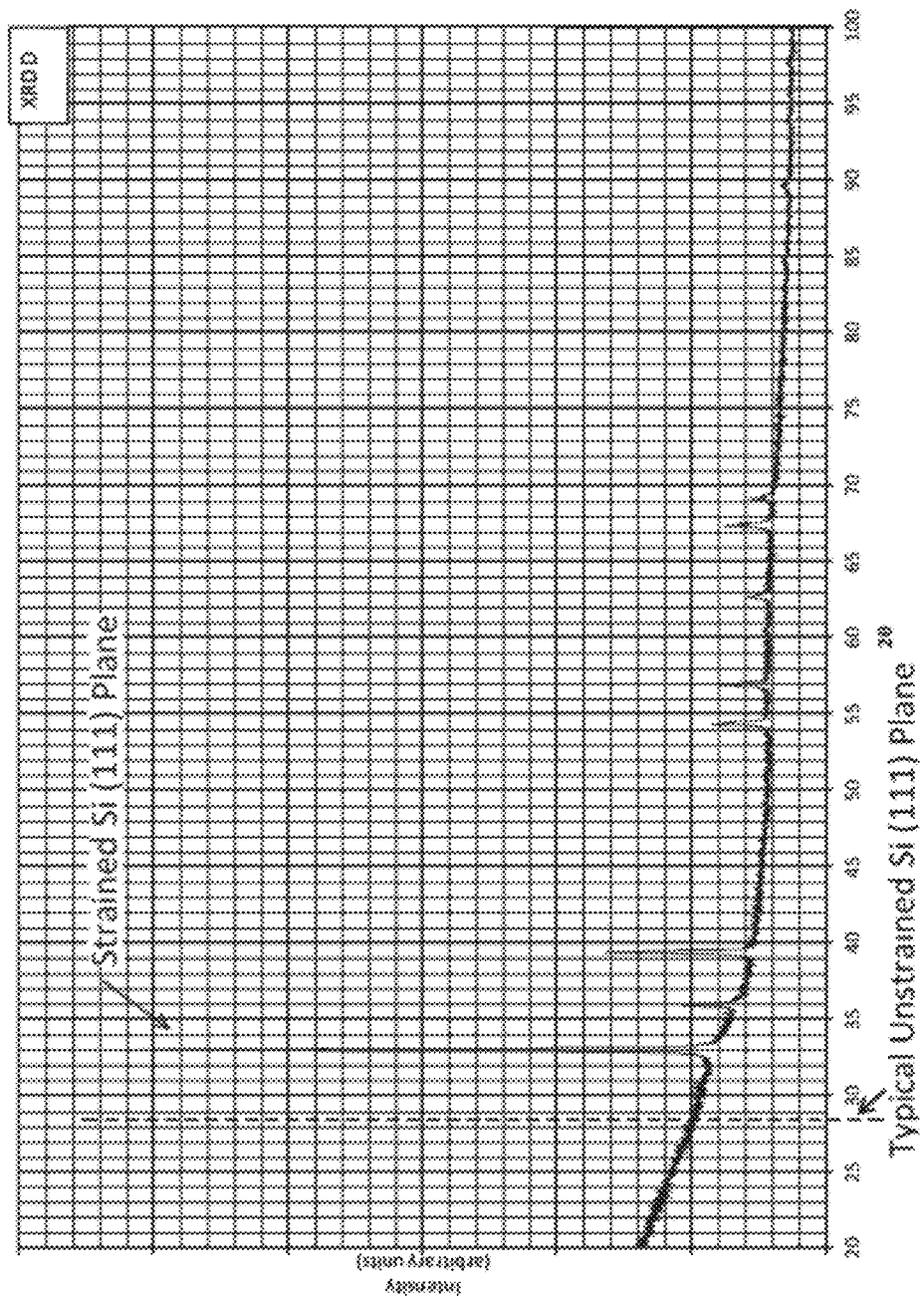
FIG. 7A graphically illustrates an XRD plot comparing the strained silicon 111 crystal plane of the crystal of FIG. 4 to a standard unstrained silicon 111 plane.
Figure 7B:
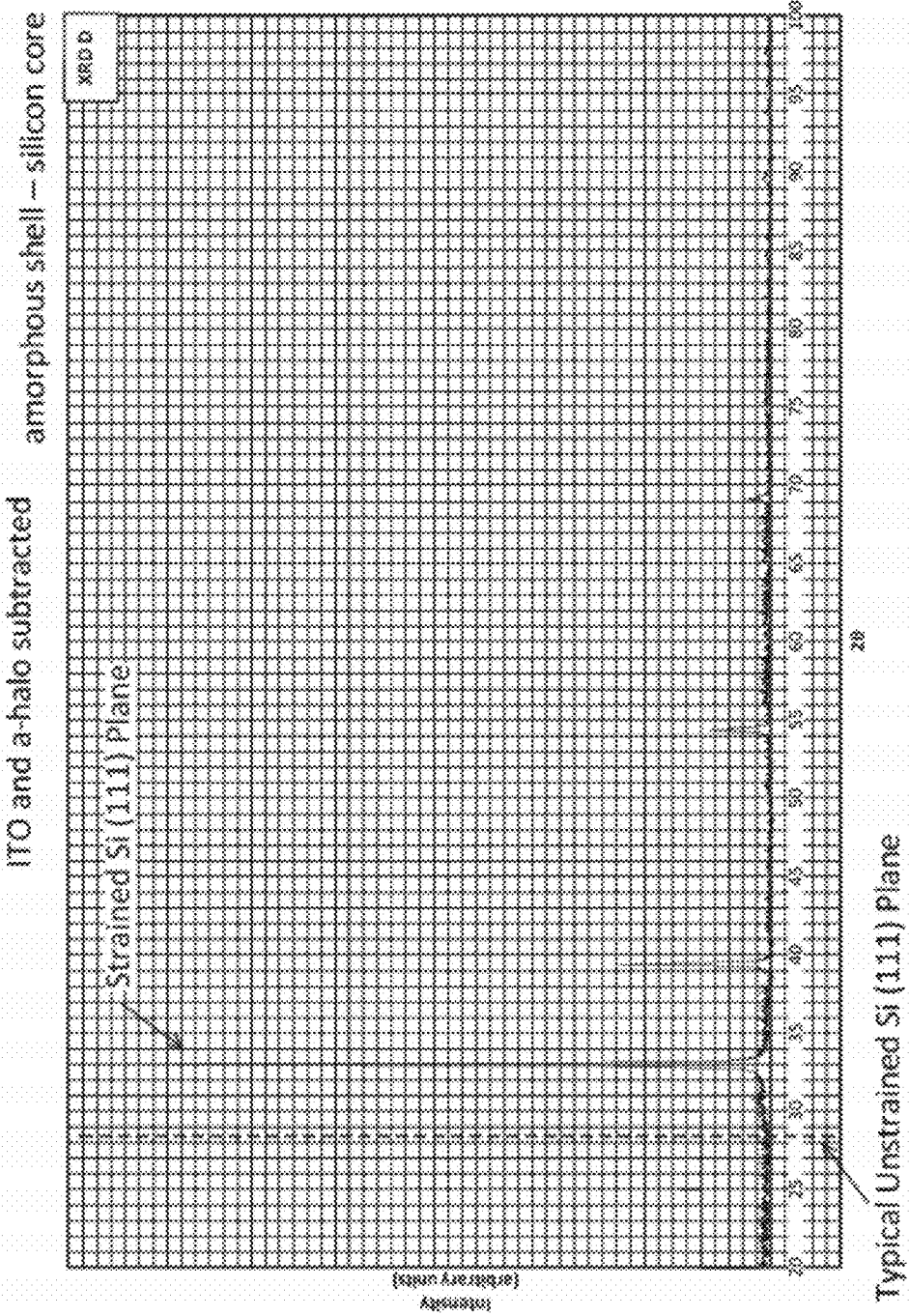
FIG. 7B graphically illustrates an XRD plot comparing the strained silicon 111 crystal plane of the crystal of FIG. 4 to a standard unstrained silicon 111 plane, corrected for contributions from an ITO conductive layer and the amorphous glass halo and/or shell surrounding the silicon crystal.
Figure 8:
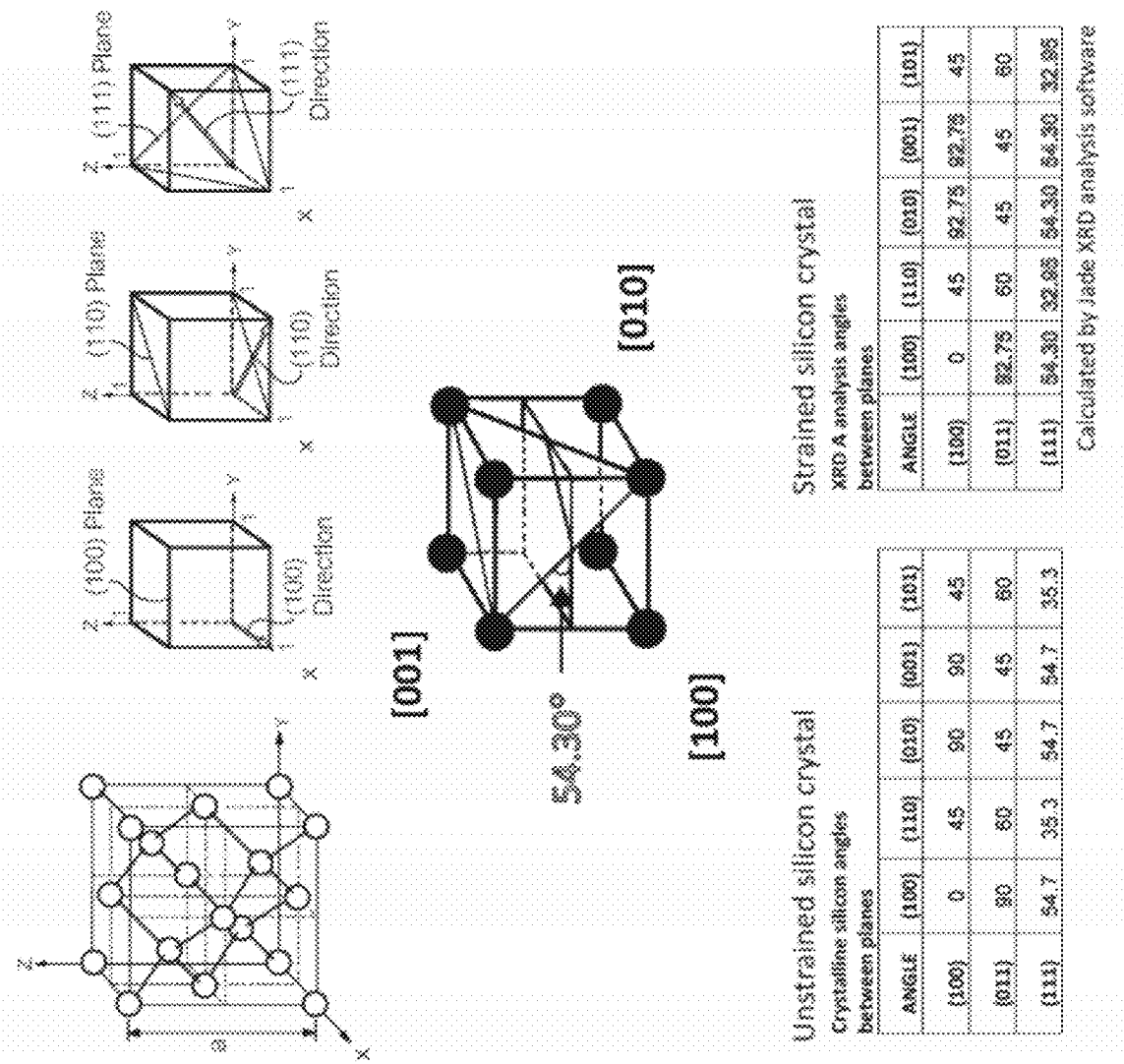
FIG. 8 graphically illustrated the crystal structure of strained silicon.
Figure 9:
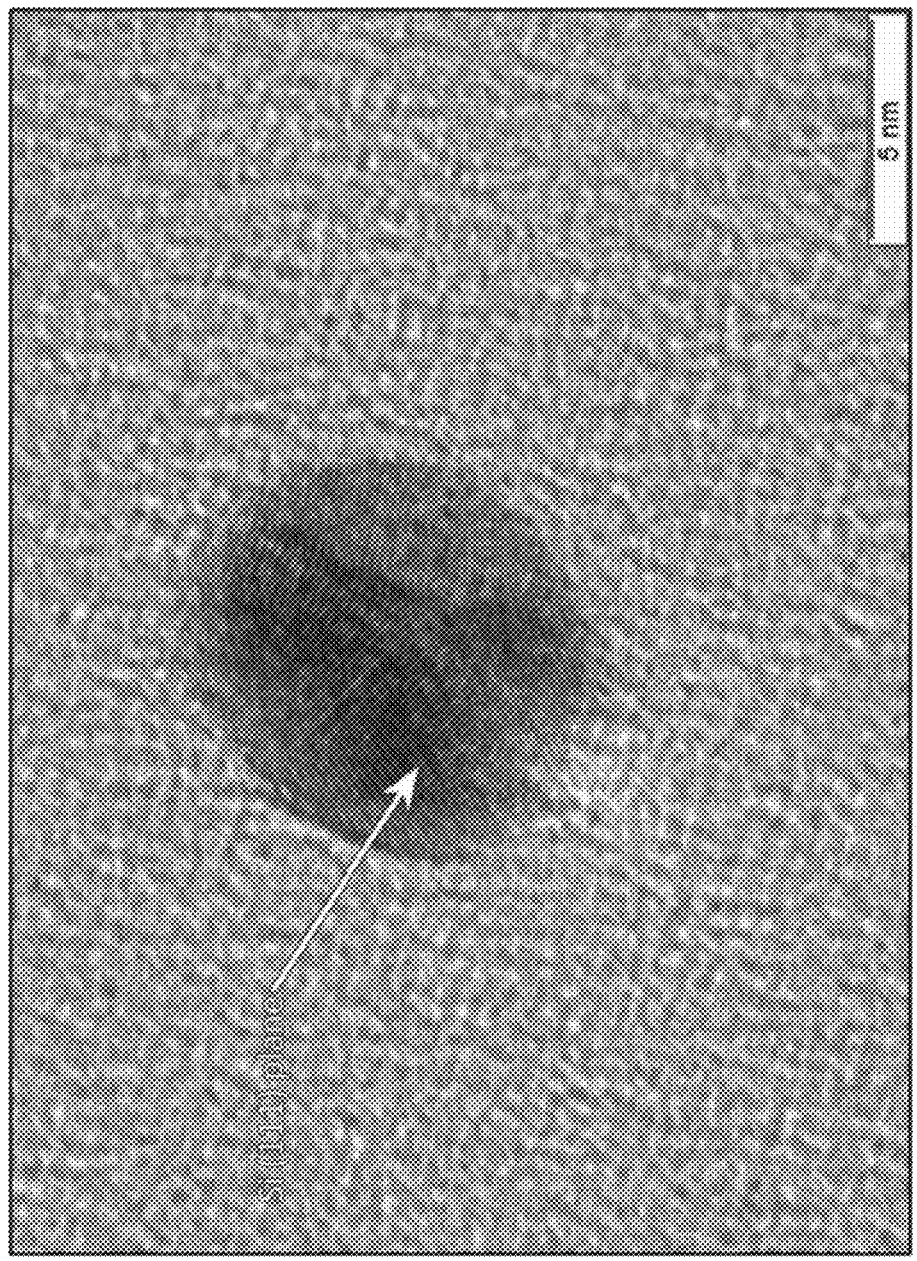
FIG. 9 is a TEM photomicrograph of a strained silicon nanocrystal having observable lattice planes.
Figure 10:
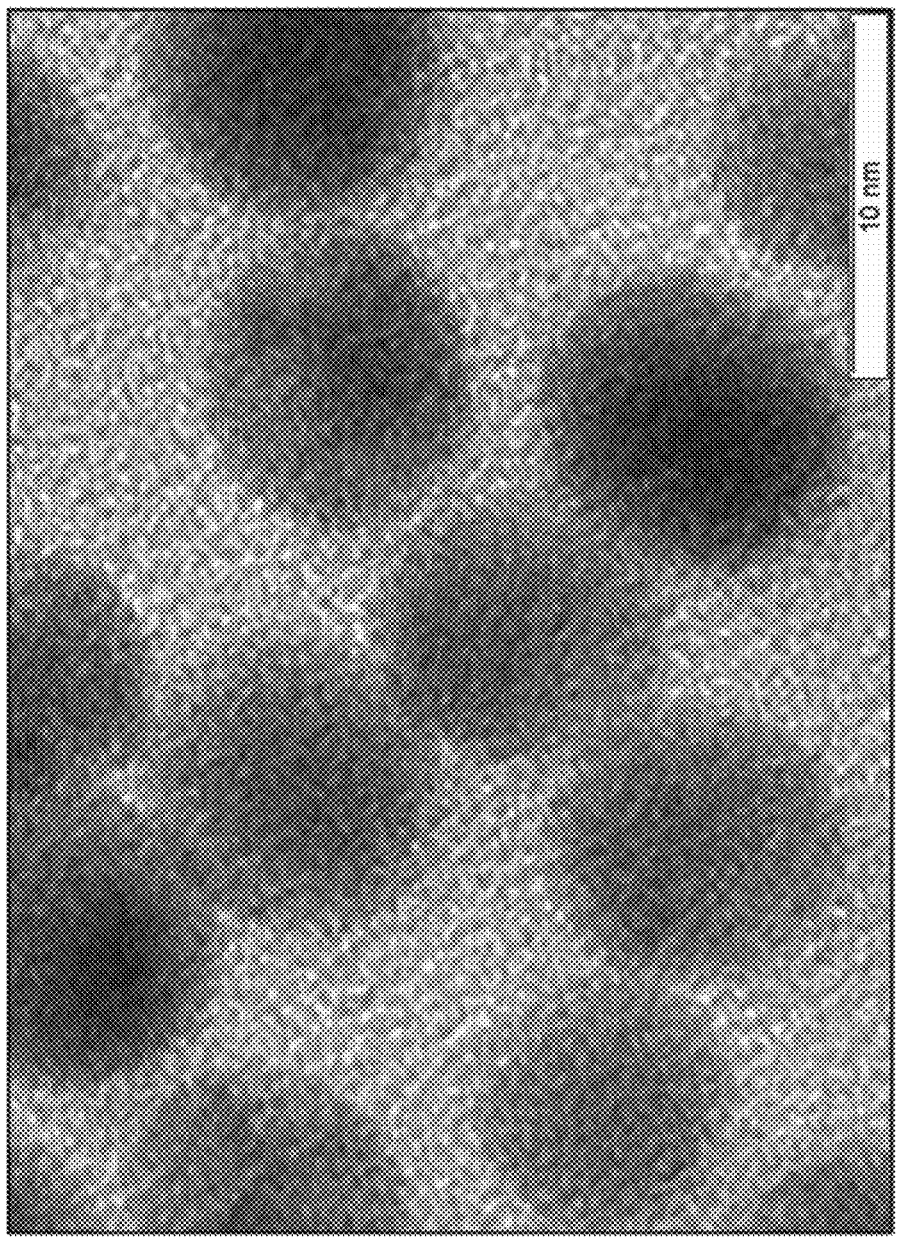
FIG. 10 is a TEM photomicrograph of a plurality of strained silicon nanocrystals, each having observable lattice planes.
Figure 11:
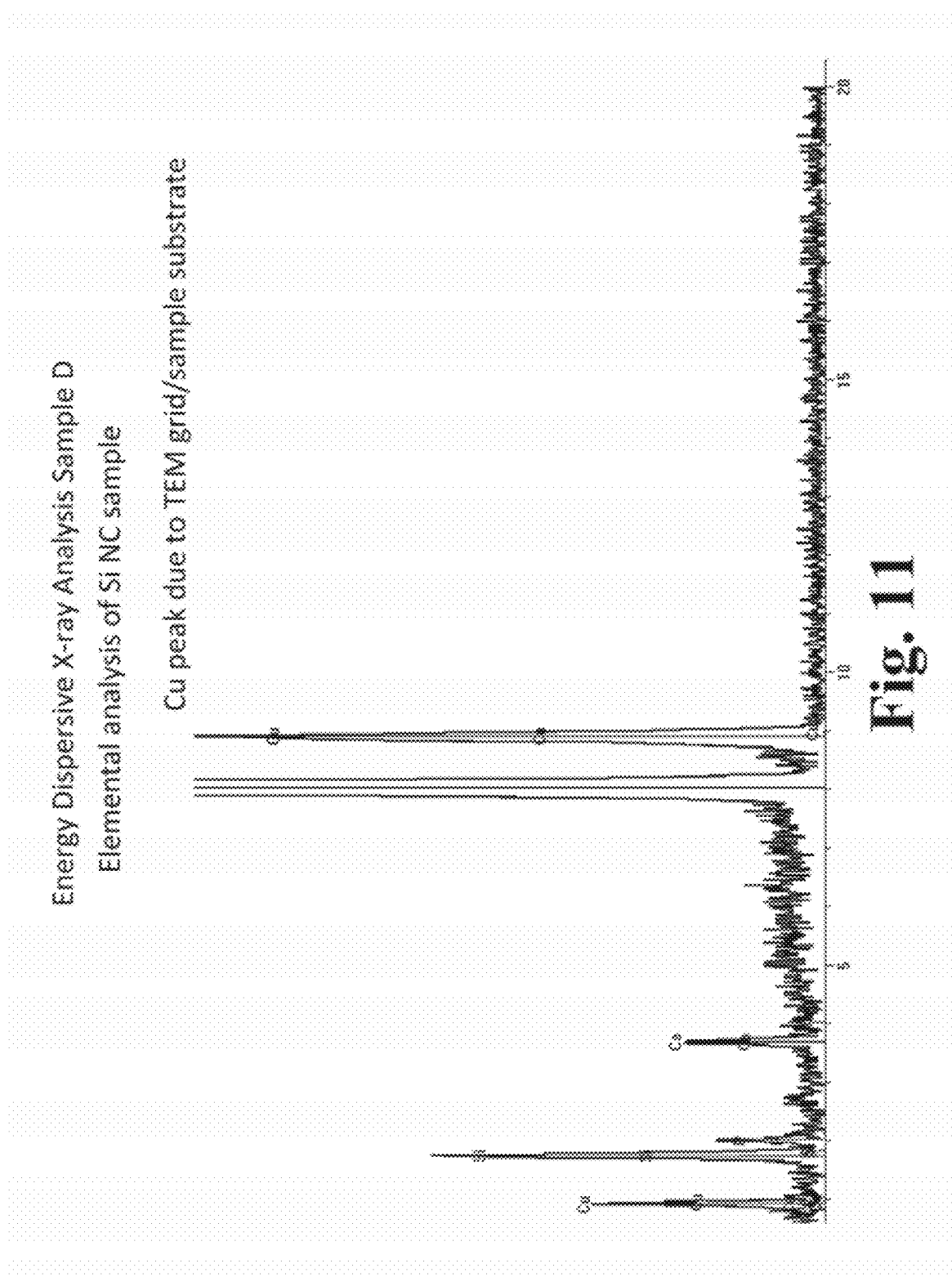
FIG. 11 graphically illustrates an EDX analysis of the nanocrystals of FIG. 10.
Figure 12:
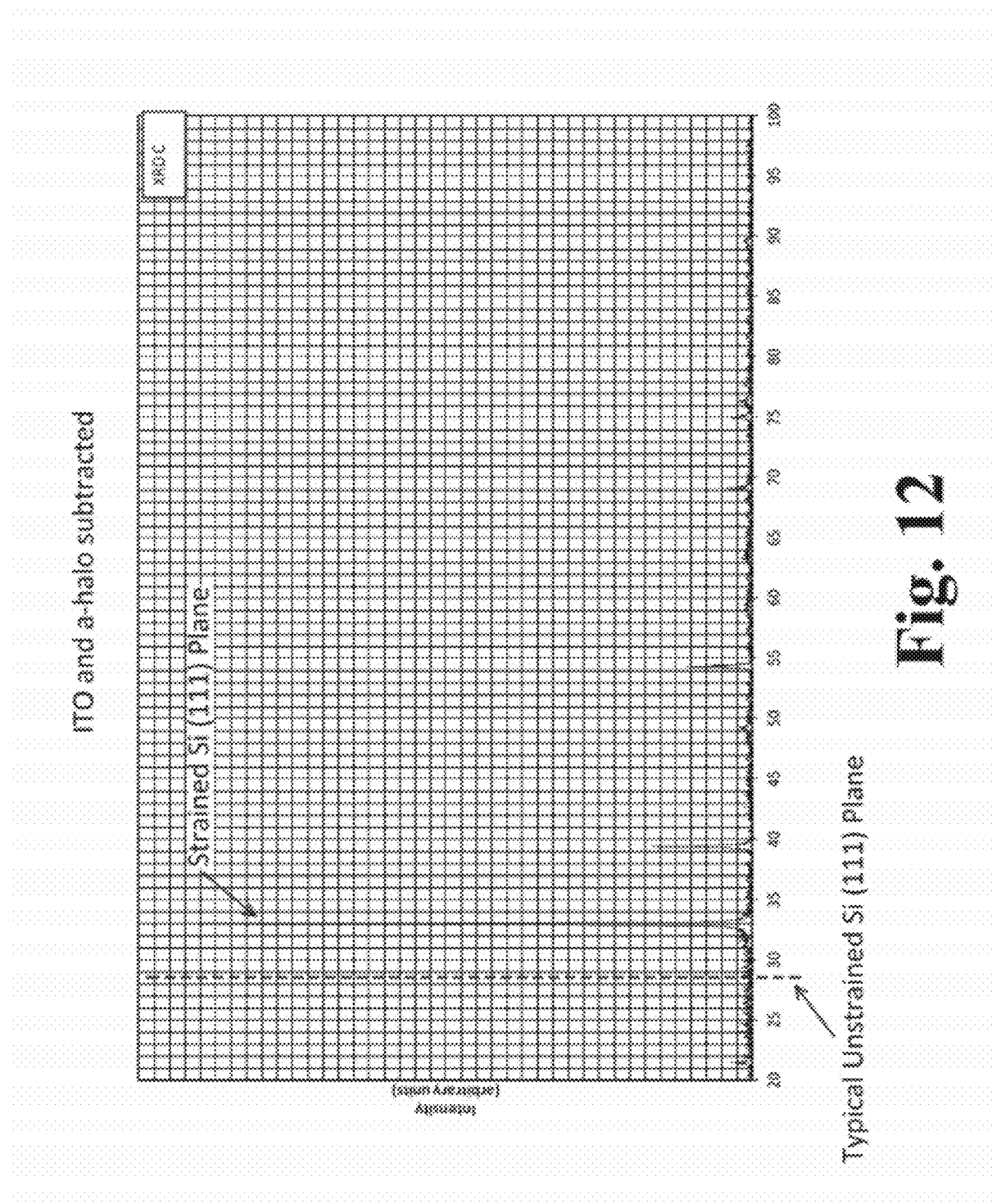
FIG. 12 graphically illustrates an XRD plot for the crystals of FIG. 10 showing the shift of the 111 plane due to induced strain.
Figure 13:
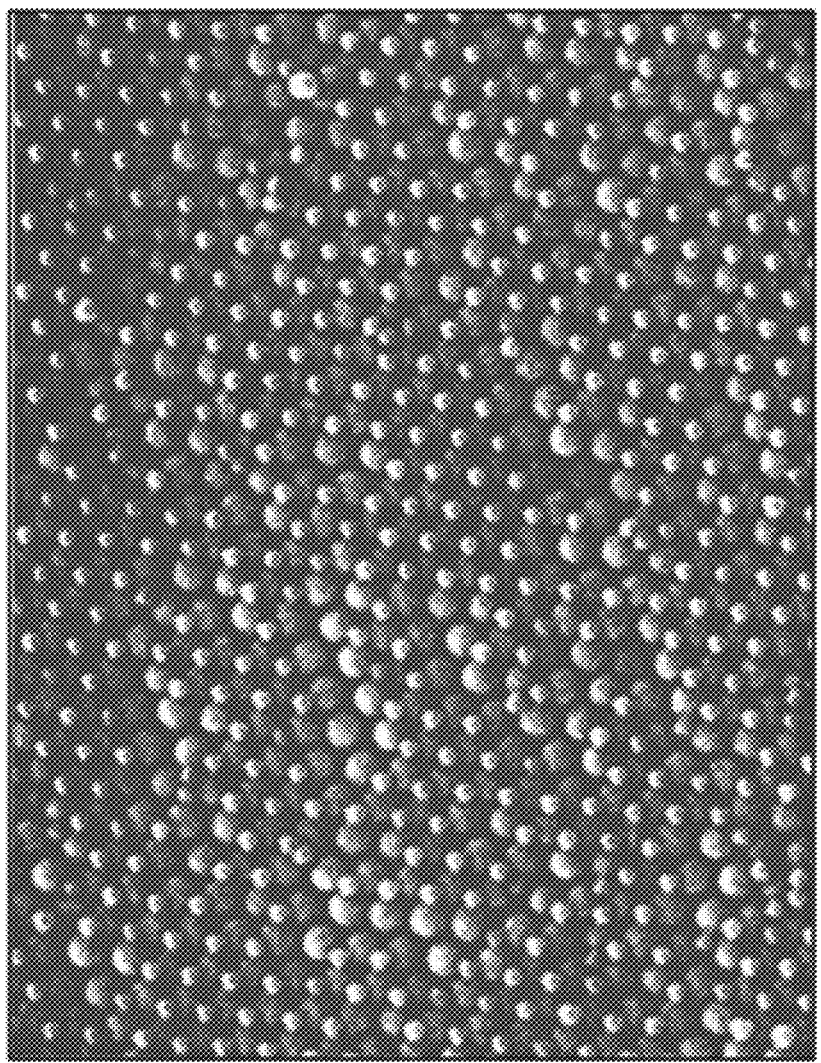
FIG. 13 is an SEM image of a layer of smaller (9 nm) silicon nanocrystals deposited over a layer of larger (25 nm) silicon nanocrystals.

For the purposes of promoting an understanding of the principles of the novel technology, reference will now be made to the embodiments illustrated in the drawings and specific language will be used to describe the same. It will nevertheless be understood that no limitation of the scope of the novel technology is thereby intended, such alterations and further modifications in the illustrated device, and such further applications of the principles of the novel technology as illustrated therein being contemplated as would normally occur to one skilled in the art to which the novel technology relates.

Piezoelectric Effect

Piezoelectricity is the special circumstance of electrical charge build-up that arises in certain solid material structures due to mechanical stress. Generally, the piezoelectric effect has been experimentally determined to be a linear electromechanical interaction between the mechanical and the electrical state in crystalline materials with no inversion symmetry. The piezoelectric effect is a reversible process such that the internal generation of electrical charge resulting from an applied mechanical force can be reversed with the internal generation of a mechanical strain resulting from an applied electrical field.

Piezoelectric Effect in Semiconductors

In semiconductors, changes in inter-atomic spacing resulting from strain affects the semiconductors intrinsic band gap making it easier (or harder depending on the material and strain) for electrons to be raised into the conduction band. The piezoelectric effect of semiconductor materials can be several orders of magnitudes larger than the analogous geometrical effect in metals and is present in materials like germanium, polycrystalline silicon, amorphous silicon, silicon carbide, and single crystal silicon.

The piezo effects of semiconductors have been used for sensor devices with a variety of semiconductor materials such as germanium, polycrystalline silicon, amorphous silicon, and single crystal silicon. Since silicon is currently the material of choice for nearly all integrated circuits, the use of piezoelectric silicon devices has been an intense area of research interest.

Piezoresistive Effect in Single Crystal Silicon and Germanium

The resistance of silicon and germanium can change due to a stress-induced change of geometry, but also due to the stress dependent resistivity of the material. The resistance of n-type silicon (predominant charge carriers responsible for electrical conduction are electrons) mainly changes due to a shift of the three different conducting vertices of the crystal. The shifting causes a redistribution of the carriers between vertices with different mobilities. This results in varying mobilities dependent on the direction of current flow. A minor effect is due to the effective mass change related to shape distortion due to change in the inter-atomic spacing of valley vertices in single crystal silicon. In p-type silicon (predominant charge carriers responsible for electrical conduction are holes) the phenomena currently being researched are more complex and also demonstrate changes in mass and hole transfer.

Detailed Description of Piezoelectric Mechanism

The nature of the piezoelectric effect is rooted in the occurrence of electric dipole moments in solids. An electric dipole moment is a vector quantity equal to the product of the magnitude of charge and the distance of separation between the charges. Electric dipole moments in solids may either be induced for ions on crystal lattice sites as in an asymmetric charge environment such as in lithium tantalate and lead zirconate-titanate or may be directly carried by molecular groups such as in organic sugar molecules. The dipole density causing polarization is the sum of the dipole moments per unit volume of a crystal unit cell. Since electric dipoles are vector quantities (geometric objects of specific magnitude and direction), the dipole density P is also a vector quantity. Dipoles near each other tend to be aligned in regions called Weiss domains. In these aligned regions occurring between individual particles, the particles act as a whole thus the potential and polarity of voltage and magnitude and direction of the current is equal to the sum of all individual particles making up the entire solid.

To reiterate, typically the piezoelectric effect typically occurs with an applied mechanical stress but can also be manifested by manufacturing internal stress into certain solids. Piezoelectricity arises in a variation of the polarization strength, its direction or both. The magnitude and direction of the charge depends on the interrelationships between the orientation of P within individual particles, particle symmetry, and the applied mechanical stress or induced internal stress. Although the change in an individual crystal's dipole density appears quantitatively as a variation of surface charge density upon the individual crystal faces, the overall useful energy arising from the piezoelectfic phenomenon is caused by superposition of the dipole densities of the crystals that make up the entire piece of material, i.e., as a sum of the individual crystallographic unit cells that make up a whole crystal. For example, a 1 $cm^3$ cube of quartz with 500 lb of mechanically applied force at the right point can produce a voltage of 12500 V because the resultant force is the sum of all the individual crystallographic unit cells that make up the whole crystal.

Power Generation in Polar Crystal Structures Synthesized in a State of Stress

There are 32 crystal classes that represent 32 possible combinations of symmetry operations in crystalline materials. Each crystal class includes crystal faces that uniquely define the symmetry of the class. Of the thirty-two crystal classes, twenty-one are non-centrosymmetric (not having a centre of symmetry), and of these, twenty exhibit direct piezoelectricity. Ten of these include the polar crystal classes, which show a spontaneous polarization without an applied mechanical stress due to a non-vanishing electric dipole moment associated with asymmetry inherent in their crystal structure. For polar crystals, for which the summation of the dipole density P≠0 holds without applying a mechanical load, the piezoelectric effect manifests itself by changing the magnitude or the direction of P or both. Stated another way, polar crystals that can be manufactured to have internal stress will demonstrate a piezoelectric effect without an applied mechanical load.

Restated another way, for non-polar piezoelectric crystals, an applied mechanical load transforms the material from a non-polar crystal class (P=0) to a polar one, having P≠0 and hence gives rise to a voltage potential and useful energy capable of powering an external device. However, crystals predisposed to an internal state of stress have an inherent polar structure for which P≠0 and hence energy can be discharged from the structure without an applied mechanical load. During discharge of electrical energy, the crystal relaxes back into its preferred state of interatomic spacing.

Quantum Confinement in Nanoparticles

Quantum confinement in nanocrystals is an important concept to grasp. Quantum confinement in nanocrystals occurs when the physical size of the particle is less than its characteristic exciton Bohr radius. The exciton Bohr radius is the physical distance separating a negatively charged electron from its positively charged hole left behind during excitation. When the physical size of the particle is less than the distance the electron must travel during excitation, the material is considered to be quantum confined. For example, the exciton Bohr radius for germanium is 24.3 nm; however, it is possible to synthesize germanium nanocrystals to be 1 nanometer in diameter. By creating nanoparticles smaller than this characteristic distance, the electronic properties of the nanoparticles can be tuned to discreet energy levels by adjusting particle size. Thus, an aggregate made of particles smaller than the Bohr radius will enjoy a greatly increased energy density. If the particles are about the same size as the Bohr exciton radius, or even a little larger, an aggregate of the particles will still enjoy increased energy density, if not to the same degree as if all of the particles were smaller than the exciton Bohr radius.

Another important concept to understand is that of potential wells and how they arise in nanoparticles. Potential wells are a direct result of synthesizing physical particle dimensions to be smaller than their respective exciton Bohr radius. A potential well is the region surrounding a local minimum of potential energy in nanomaterials. Energy captured in a potential well is unable to convert to another type of energy because it is captured in the local minimum of the potential well. Therefore, a body may not proceed to the global minimum of potential energy, as it naturally would according to the universal nature of entropy.

Energy may be released from a potential well if sufficient energy is added to the system such that the local minimum energy for excitation is sufficiently overcome. However, in quantum physics potential energy may escape a potential well without added energy due to the probabilistic characteristics of quantum particles. In these cases, a particle may be imagined to tunnel through the walls of a potential well without energy added to the system.

As illustrated in FIGS. 1A-3, the present novel technology relates to a method of producing a coating or film 10 on a substrate 15 under conditions of ambient atmospheric composition and pressure, and ambient or slightly elevated temperature, by electrophoretically extracting 20 nanoscale particles or nanocrystals 25 from a nonaqueous colloidal suspension 30 and substantially uniformly depositing 35 the nanoparticles 25 onto the substrate 15. Typically, the coating or film 10 is less than 1000 nanometers in thickness, but may be thicker. A substrate 15 desired to be coated is typically prepared by first cleaning 40 the substrate 15, and then, if the substrate 15 is not sufficiently electrically conductive, coating 43 the substrate 15 with a layer of conductive material 45, such as silver or indium tin oxide (typically used to prepare optical elements, since thin layers of indium tin oxide are substantially optically transparent).

A nonaqueous suspension 30 of nanoparticles 25 is then prepared. The liquid suspension medium 50 is typically a polar solvent, such as 2-butanol, 1,2-dichlorobenezene and/or acetone, or the like. Typically, the solvent 50 composition is selected taking into account such properties as its inherent dielectric constant, its Hamaker constant, its miscibility, its viscosity, and the like. More typically, a blend of aprotic polar nonaqueous solvents 55 and protic polar nonaqueous solvents 60 is selected to define the liquid suspension medium 50.

More typically, small amounts of an ionic liquid 65, such as 1-butyl-1 methylpyrrolinium dis(perifluoromethylsulfonyl)imide, are added to the nonaqueous solvent blend 50 to facilitate deposition of nanoparticle films 10. A predetermined and measured amount of nanoparticles 25 is then dispersed in the solvent blend 50. The solvent blend 50 is typically agitated until the nanoparticles 25 are generally evenly and homogeneously dispersed to define a colloidal suspension 30. A buffer solution may be added to the colloidal suspension 30 to manage the surface charge on the nanoparticles 25. For example, silicon particles are negatively charged in the pH range between about 6 and about 9 while germanium particles are negatively charged in the pH range from about 3 to about 5.

The substrate 15 is then connected to a DC power source 70 to serve as a first electrode 75 while the DC source 70 is connected to the solvent bath 30 through a second electrode or electrode array 80 immersed therein (such as a carbon electrode) to complete an electric circuit and establish an electric field, with the substrate 15 having an opposite charge to that imparted to the suspended particles 25. The substrate 15 is typically the cathode 75 and the carbon electrode is typically the anode 80. The electrodes/electrode arrays 75, 80 are typically maintained at a distance of between about 0.5 and about 4.0 centimeters apart, depending upon such variables as the desired deposition pattern, the shape of the electrodes 75, 80, the shape of the substrate 15, and the like; however, under certain circumstances the electrode separation distance may fall outside of the 0.5 to 4.0 centimeter range. The applied voltage is typically between about 3 and about 12 volts, depending on the nanocrystal particle size (typically between about 1 and 1000 nanometers in dimension, more typically between about 2 and about 50 nanometers in diameter). The particles 25 in the suspension 30 will electrophoretically migrate to the substrate 15, forming a substantially even coating 10 thereupon.

The nanoparticles 25 may be of any convenient shape and geometry, and are generally regularly shaped and are typically blocky, and, more typically, generally spherical. Typically, the nanoparticles 25 will be tightly sized, having a relatively narrow particle size distribution (PSD), to yield a coating or film 10 of nanoparticles 25 having a narrow particle size distribution, such as, for example, wherein most of the particles 25 fall in the 3-10 nanometer range. Alternately, the applied voltage, current and/or the pH of the colloidal solution 30 may be varied to yield similar control over the size of the deposited particles 25 when the colloidal solution 30 includes a substantial amount of particles 25 falling outside the target size range. Further, by varying the applied voltage and/or the pH of the medium 30, multiple layers 90 of nanocrystals may be applied to a substrate 15 in a predetermined, size-specific of graduated order. The deposition process 35 is continued until the desired film thickness is achieved, typically for about 30 seconds to about 5 minutes to yield a deposited layer 90 typically from a few hundred to a few thousand nanometers thick. Typically, the deposition process 35 is conducted under ambient atmosphere; no vacuum is required.

Typically, the nanocrystals 25 are of very high purity, typically at least about 99.999 percent pure, more typically at least about 99.9999 percent pure, and still more typically at least about 99.999999 percent pure. The nanocrystals 25 may be monodisperse within +/−10% of the desired diameter and may be single crystal/single grain boundary materials, but are not limited to these types and size dispersions. As illustrated in FIGS. 4-8, it is also possible to deposit nanoparticles 25 that have a multilayered or core/shell structure, such as a crystalline core 130 within an amorphous shell 140, wherein the shell 140 compresses the core 130 to generate stress and maintain strain therein. This effective surface area of the film 10 is a function of the nanocrystalline particle size and shape and is governed by the desired end use and does not change the method of deposition. Likewise, there is no requirement that the electrode or electrode array 80 be of equal or larger size than the conductive substrate 75 that the nanoparticles will be deposited upon.

EXAMPLE 1

Eighty milligrams of 9-nanometer silicon particles are suspended in 10 milliliters of 2-butanol to yield a colloidal suspension with a concentration of about 8 milligrams silicon nanoparticles/1 milliliter 2-butanol. 10 milliliters of reagent grade acetone is added to the colloidal suspension. 300 microliters of 1-butyl-1methylpyrrolinium dis(perifluoromethylsulfonyl)imide is added to the colloidal suspension. The colloidal suspension is heated to a temperature of about 40 degrees Celsius. A 1 cm×2 cm glass substrate coated with indium tin oxide and having a resistance of about 8 ohms/sq cm is connected to the cathode of a DC power supply and immersed 1 cm into the colloidal suspension. A carbon electrode is connected to the anode of the DC power supply and spaced 1 centimeter from the glass substrate in the suspension. A voltage potential of 4 volts is applied across the electrodes and allowed to remain for 180 seconds while a silicon film having a thickness of between about 500 and about 800 nanometers is deposited on the glass substrate area that was submersed in the colloid solution.

EXAMPLE 2

Eighty milligrams of highly pure germanium nanocrystal particles were obtained from the Universal Nanotech Corporation. The germanium particles were characterized by an average particle diameter of about 10 nanometers were suspended in a polar protic solvent, such as MeOH, to yield a colloidal suspension. Oleyalamine is added to the colloidal suspension to assist in maintaining the germanium nanoparticles in suspension. The colloidal suspension is typically maintained at a temperature of between about 25 and about 40 degrees Celsius A 1 cm×2 cm glass substrate coated with indium tin oxide and having a resistance of about 8 ohms/sq cm is connected to the cathode of a DC power supply and immersed 1 cm into the colloidal suspension. A carbon electrode is connected to the anode of the DC power supply and spaced 1 centimeter from the glass substrate in the suspension. A voltage potential of between about 1.5 and about 7 volts is applied across the electrodes and allowed to remain for from about 180 seconds to about 5 minutes while a germanium film is deposited on the glass substrate area that was submersed in the colloid solution.

Devices made from Group IV nanoparticles 25 benefit from the unique and size-driven physical characteristics of these nanoparticles 25, sometimes referred to as "quantum dots". Semiconductors are materials that conduct electricity, but only very poorly. Unlike metals, which have an abundance of free electrons capable of supporting electrical conduction, the electrons in semiconductors are mostly bound. However, some are so loosely bound that they may be excited free of atomic binding by the absorption of energy, such as from an incident photon. Such an event produces an exciton, which is essentially an electron-hole pair, the hole being the net-positively charged lattice site left behind by the freed electron. In most crystals, sufficient excitons may be created such that the freed electrons may be thought of as leaving the valence band and entering the conduction band. The natural physical separation between the electron and its respective hole varies from substance to substance and is called the exciton Bohr radius. In relatively large semiconductor crystals, the exciton Bohr radius is small compared to the dimensions of the crystal and the concept of the conduction band is valid. However, in nanoscale semiconductor crystals or quantum dots, the exciton Bohr radius is on the order of the physical dimension of the crystal or smaller, and the exciton is thus confined. This quantum confinement results in the creation of discrete energy levels and not a continuous band. Exploitation of this phenomenon, such as by coatings of nanoscale semiconductor crystals 25, can yield such devices as photovoltaic cells 'tuned' to specific wavelengths of photons to optimize energy transduction efficiency, rechargeable batteries, photodetectors, flexible video displays or monitors, and the like. Quantum Confined Piezoelectric Effect in Strained Silicon and Germanium Nanoparticles Amplified piezoelectric effects may be observed in quantum-confined nanocrystals 25 such as lead zirconate-titanate, gallium nitride, and indium gallium nitride. In one embodiment of the present novel technology, devices 100 exploit the amplified piezoelectric effects in quantum confined silicon and germanium nanocrystals 25 synthesized in a state of predetermined strain (See FIGS. 4-15).

The strain manufactured into the silicon and germanium nanocrystals 25 defining the devices 100 may be further increased through intercalation of additional appropriately sized, small molecules, such as lithium, sodium, or the like. Intercalation is the typically reversible inclusion of a molecule between two other molecules. The novel devices 100 incorporate the intercalation of a small intercalation atom or ion 107, such as lithium, into the crystal lattice structures of silicon and/or germanium nanocrystals 25 to yield intercalated nanocrystals 110 with internal stresses to further strain the crystal structure and hence increase the energy density, and subsequently the power output capabilities, of the device 100.

The instant internally strained quantum confined silicon and germanium nanocrystals 25 and/or intercalated nanocrystals 110 are deposited onto a conductive substrate 15 into a highly ordered cohesive film 10 via the electrophoretic deposition process as discussed above. During deposition, the nanocrystals 25 self-assemble into a highly ordered structure according to their dipole moments and define a unified Weiss domain throughout the film 10. Once electrophoretic deposition 35 of the particles 25 is complete, a metal contact 115 is deposited via thermal evaporation or the like over the film 10 to protect the nanoparticle film 10 and establish a pathway for electrons to travel to be used to power an external device. The metal contact 115 is typically a highly electrically conductive metal, such as gold, platinum, silver, copper or the like, and is typically between about 100 nanometers and 400 nanometers thick.

EXAMPLE 3

A thin film of a mixture of size specific semiconducting nanocrystals 25 was deposited via EPD on ITO coated glass, as described in the above specification and examples. The ultrapure prestrained semiconducting nanocrystals 25 were obtained from the Universal Nanotech Corporation, 1740 Del Range Blvd., PMB 170, Cheyenne, Wyo., 82009. Typically, the nanocrystals 25 are at least about 99.99999 percent pure, more typically at least about 99.999999 percent pure, and still more typically, at least about 99.9999999 percent pure. The substrate 15 and deposited film 10 placed in a low oxygen environment at room temperature and the substrate 15 was then masked to define a desired back contact location. Next, using a thermal evaporator/vacuum coater or like device, the film 10 was placed with the nanocoated side toward the material to be deposited, at a distance of approximately 1-5 cm. A high vacuum environment was formed around the substrate 15 and an appropriate Voltage/Current combination is applied to vaporize the desired metal to be deposited. The vaporized metal was deposited onto the substrate 15 to create a complete layer 115 that is both protective and allows for electrical connections. In general, this deposition process may take from approximately 5 seconds to about 5 minutes, depending on the desired back contact 115 thickness. Once the metal layer 115 was deposited, the vacuum was removed and the film 10 was allowed to return to a typical room temperature environment. The masking was then removed in a low oxygen environment, leaving the desired metal deposition pattern on the film. A voltmeter and/or ammeter was used to confirm that power was being supplied by the newly created quantum energy device (QED). Using standard electrical connection techniques, multiple films 10 may be connected in a series/parallel fashion to yield a device 100 configured to generate the desired voltage/current supply configuration. A QED device 100 was completed and configured to power a desired load.

Quantum energy devices 100 as described above in Example 3 may be produced from layered semiconducting nanocrystals 25, such as silicon nanocrystals. Typically, the nanocrystalline films 10 include a mixture of multiple sizes of specific nanoparticles, ranging from 1 nm to about 500 nm in diameter, although narrow, monomodal size distributors may be desired for specific applications. Such a multimodal particle size distribution (PSD) yields high energy storage and/or power transduction/generation/supply characteristics in the QED device 100. Typically, for each mode more than 95 percent of the particles fall within 2 nanometers of the mode dimension. In some embodiments, the nanocrystals 10 are provided in a predetermined bimodal or multimodal size distribution, such that the nanocrystals 10 may be deposited to take advantage of more efficient packing density (see FIG. 13). For example, a first sublayer 90 of larger diameter particles 10 (such as 25 nm) may be deposited, and a second sublayer 90 of smaller diameter particles 25 (such as 9 nm) may be deposited thereupon, with the smaller particles 25 preferentially sitting in the interstices defined by the first particles 25.

Figure 14:
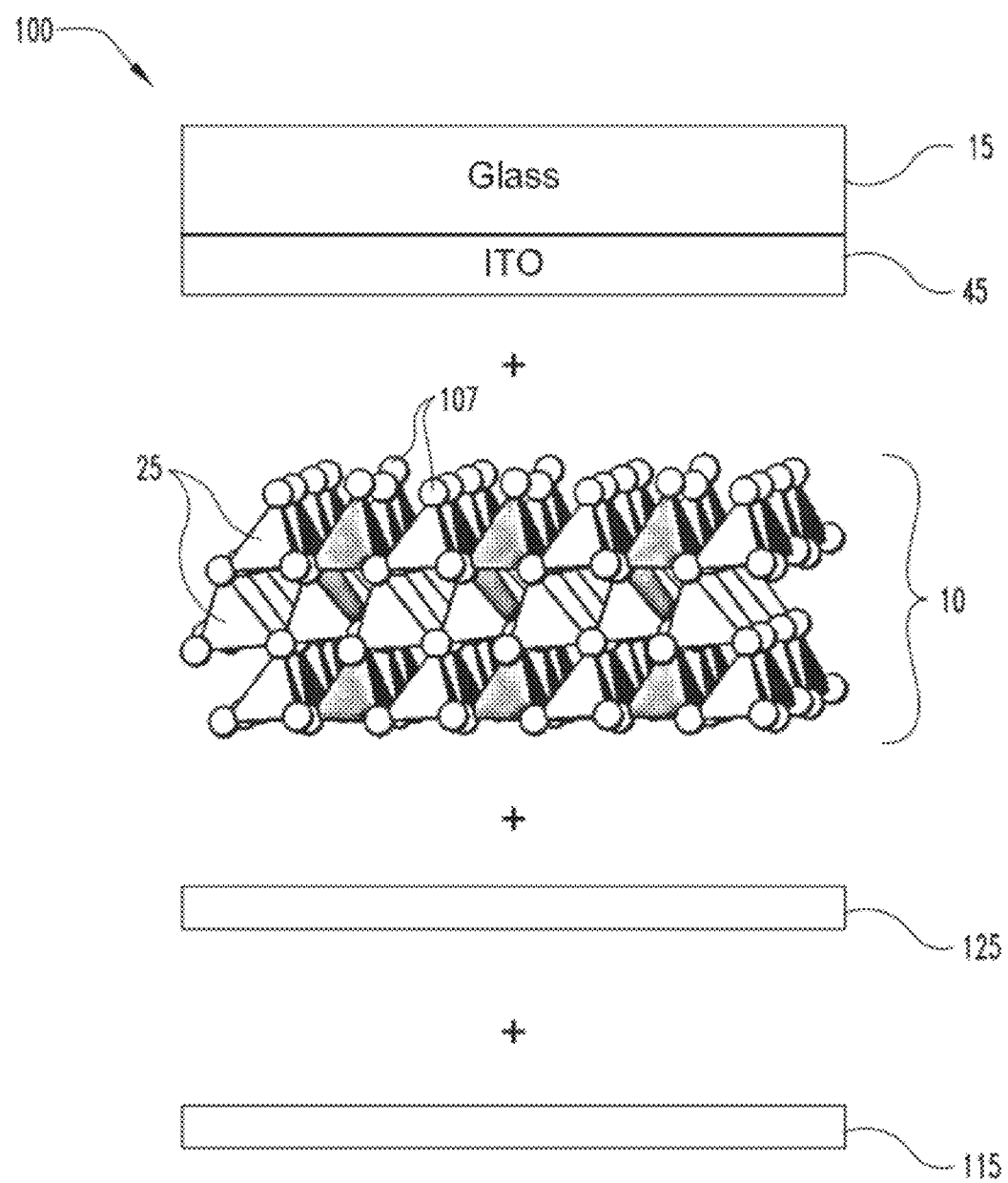
FIG. 14 is an exploded view of a internally strained semiconducting nanocrystalline film deposited on a conductive substrate according and defining a voltage source a third embodiment of the present novel technology.

As illustrated in FIG. 14, a film of conducting nanowires 125, formed from such materials as such as ZnO, MgO or the like, deposited onto the surface of the nanoparticles film 10, such as through vacuum evaporation or like techniques, may yield effects such as lower series resistance and/or increased electrical conductivity and increased in power discharge capabilities of the QED. This film 125 may be in place of or in addition to the metal backing layer 115.

The typical film thickness of a single layer 10 is in the range of 200 nm-1500 nm. Voltages ranging from 0.1 V-18V in a 1 cm$^2$ single layer film 10 are achievable and have been verified by measurement. Currents ranging from 10 uA-50 mA are achievable in a single layer film 10 and have been verified by measurement.

A QED device 100 has been successfully completed demonstrating individual QED units fabricated using the EPD nanoparticles deposition method, described hereinabove. The individual QED units 100 are wired together, in series or in parallel, to increase the total output voltage or current, respectively. The QED device 100 manufactured by the EPD of nanoparticles 25 has demonstrated the capability to power LEDs and other electronic devices with similar power requirements. Combinations of multiple different sizes of nanoparticles 25 and types of nanoparticles 25 may be used to generate QED devices 100 having specifically tailored and desired output characteristics. Multiple layers 90 of nanoparticles 25 may be utilized, and metal layers 115 may be interspersed or mixed between the nanoparticulate semiconducting layers 90. Metallic and non-metallic back or front contacts 45, 115 may be utilized, depending on the desired QED output. P-type or N-type doped semiconductor (i.e., non-intrinsically doped) nanoparticles 25 may be utilized and/or mixed with intrinsic semiconducting nanoparticles 25, as desired.

Quantum Energy Device (QED) Overview

In one embodiment, as shown in FIG. 14, the present novel technology relates to a battery 100 that utilizes the unique properties of silicon and germanium nanocrystals 25. High purity silicon or germanium nanocrystals 25 ranging in size from about 1 nm to about 1000 nm are deposited on to a conductive substrate 45 by use of electrophoretic deposition (EPD). A tightly compacted thin film 10 of the silicon and/or germanium nanocrystals 25 may range in thickness from about 100 nm to about 2000 nm, depending on the desired properties of the film 10. A conductive metallic back contact 115, such as aluminum, gold, silver or the like, is applied to the thin film 10 of semiconducting nanocrystals 25 in a thickness range of about 50 nm to about 500 nm. Thermal evaporation, e-beam evaporation, sputter coating, electroplating, or the like may be used to apply the metallic back contact 115.

The silicon and germanium nanocrystals are typically synthesized with a state of stress distributed therein which slightly strains the atomic spacing of the crystal structure. This distorting or straining of the lattice imparts a piezoelectric effect which distorts the electron cloud and gives rise to a voltage potential. Direct current electrical energy may then be utilized to power electrical devices. Individual cells 100 may be wired in series or parallel to supply the desired voltage and amperage needed to power a specific device.

EXAMPLE 4

A suspension 30 of pre-strained silicon nanocrystals 25 suspended in toluene 50 was obtained from the Universal Nanotech Corporation in a concentration of approximately 100 mg per 100 ml. The suspension 30 includes a mixture of nanocrystal sizes but the majority of nanocrystals 25 were between approximately 10 nm and 150 nm in dimension. The suspension 30 was sonicated to ensure a homogeneous mixture was obtained. Then, approximately 10 ml of homogenized suspension 30 was added to a glass beaker. Approximately 10 ml of acetone was then added to the mixture. 300 microliters of 1-Butyl-1-methylpyrrolidinium bis(trifluoromethylsulfonyl)imide 65 was also added to the mixture to define an admixture 30.

The admixture 30 was then sonicated again to ensure homogeneity and heated to a temperature of 40 degrees Celsius. A magnetic stir bar was used during heating to facilitate an even temperature in the admixture 30 and to ready the admixture for electrophoretic deposition (EPD) as an EPD bath 30.

A conductive substrate 15 of glass coated with Indium Tin Oxide (ITO) 45 with an average resistance of 8 ohms per square cm and of dimensions of approximately 1 cm wide by 2.5 cm long was cleaned 40 with a spray of pressurized acetone and wiped clean. The ITO glass 15 was then attached to the negative lead (cathode) 75 on the power supply. A high purity carbon electrode 80 was attached to the positive lead (anode) on the power supply 70. The carbon electrode 80 was inserted into the EPD bath 30.

The ITO coated glass 15 was then inserted into the EPD bath 30 to a depth of approximately 1 cm with the conductive side facing the carbon electrode 80 and separated by a distance of approximately 1 cm. The power supply 70 was energized and approximately 4 volts and minimal/negligible current was applied for approximately 3 minutes. During the 3 minutes the nanocrystals 25 were deposited onto the conductive substrate 15 and were visually observed as the film 10 grew thicker and become more opaque. The power supply 70 was deenergized and the conductive substrate 15 was removed from the EPD bath 30.

After silicon nanocrystal 25 application, lithium was deposited on to the film through electroplating of lithium acetate dissolved in a solution of dimethylacetamide (DMA). The silicon nanocrystal film 10 was then submerged into the solution for electrophoretic deposition of lithium. Lithium ions 107 were intercalated into the silicon crystal structures 110 during EPD to define a device 100 having increased charge density and enhanced recharging capabilities. The device 100 was then set out to dry in a low oxygen environment at elevated temperature (about 110 degrees Celsius). It should be noted that while convenient to increase drying rate, heat is not essential.

Within 3 hours, a metallic back contact 115 was applied to prevent oxidation of the silicon thin film 10. A high purity aluminum metallic back contact 115 was applied using a thermal evaporator to a thickness of approximately 200 nm. Masking tape, metal screens, and glass were used to control the location of the metallic back 115 contact and to prevent the aluminum layer 115 from shorting to the ITO coated glass 15.

After the aluminum layer 115 was applied, the QED cell 100 was complete and is ready for wiring to a desired electrical device. Great care was taken to not touch the cell area with the silicon nanocrystals film 10 applied to prevent any shorting of the cell 100. A series and parallel circuit was then created using multiple cells 100 that were produced in the same manner. Through this process, an array of QEDs 100 were wired to generate over 3.7 volts and 50 mA. This array 100 was then connected to a TFT display screen and the device functioned as normal with the QED device 100 supplying the electrical energy.

| Typical Properties of Silicon Film of 1 square cm | |
|---|---|
| Volts | 1.5 |
| Amps | 0.005 |
| Watts | 0.0075 |
| Battery Life (hrs) | 48 |
| Watt-Hours | 0.36 |
| Kilowatt-Hours | 0.00036 |
| Megajoules (MJ) | 0.001296 |
| Grams of Si | 0.00018632 |
| Kilograms of Si | 1.8632E−07 |

-continued

| Typical Properties of Silicon Film of 1 square cm | |
|---|---|
| MJ/Kg | 6955.8 |
| Grams/Watt-Hour | 0.000518 |

| Energy Density Comparison | |
|---|---|
| Alkaline | 0.59 MJ/Kg |
| Li-ion rechargeable | 0.46 MJ/Kg |
| Zinc-air | 1.59 MJ/Kg |
| NiMH | 0.36 MJ/Kg |

The energy density observed from the arrayed QED device 100 was about 7000 MJ/Kg, several orders of magnitude higher than that of an alkaline cell, a lithium-ion battery, and the like.

Figure 15:
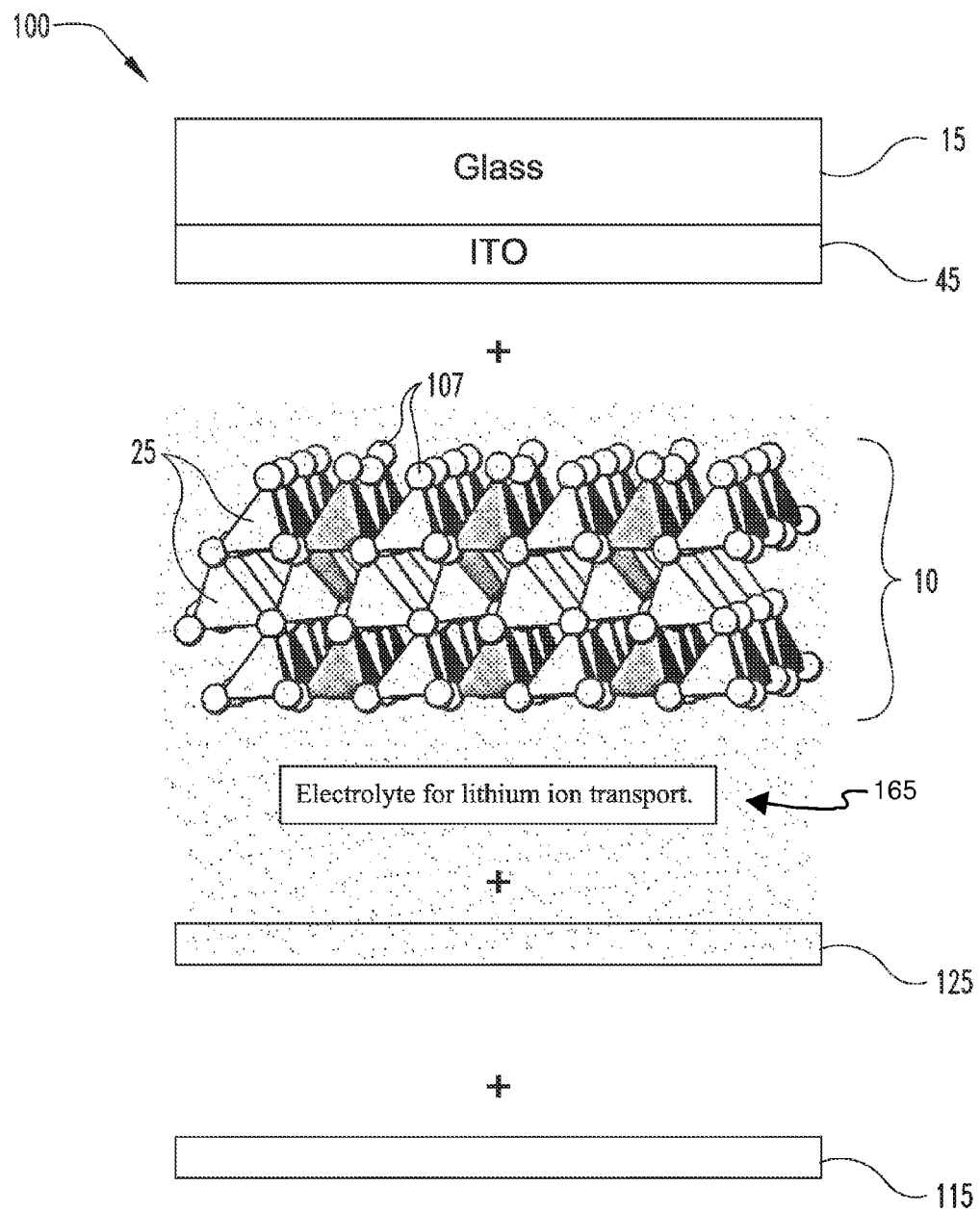
FIG. 15 is an exploded view of a internally strained semiconducting nanocrystalline film deposited on a conductive substrate according and in an electrolyte medium and defining a voltage source a third embodiment of the present novel technology.

Another embodiment device 100 is illustrated in FIG. 15. The device 100 is similar to that described above regarding FIG. 14, but with the addition of an electrolyte 165 in contact with the intercalated nanocrystals 25 making up the film 10. The electrolyte 165 composition is typically matched to the intercalation agent 107 composition (i.e., a lithium salt electrolyte for use with lithium electrodes and/or lithium intercalation to yield a lithium ion battery cell), such that the electrolyte facilitates ionic conduction and allow the device 100 to function as a voltage source for rechargeable lithium-ion batteries.

This process may be modified in various ways to benefit mass production and to tailor specific electrical properties. It is not possible to cover all permutations and therefore it is understood that this novel technology is not limited to the examples detailed above.

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

What is claimed is:

1. A power generation device comprising
an electrically conducting substrate; and
a layer of internally strained semiconducting nanocrystals deposited on the electrically conducting substrate; wherein
the internally strained semiconducting nanocrystals have a manufactured polar crystalline structure resulting from at least one crystalline plane having an equilibrium position offset from a non-polar position resulting in a nonzero electric dipole density without an applied mechanical load;
the internally strained semiconducting nanocrystals are between 2 nanometers and 50 nanometers across;
the internally strained semiconducting nanocrystals are piezoelectric;

the internally strained semiconducting nanocrystals are arranged with aligned dipole moments to define a unified Weiss domain; and the layer is between about 200 nanometers and about 1500 nanometers thick.

2. The device of claim 1 further comprising an electrically conducting metal layer deposited onto the layer of internally strained semiconducting nanocrystals.

3. The device of claim 1 further comprising a structural support layer adjacent to the electrically conducting layer.

4. The device of claim 1 wherein the internally strained semiconducting nanocrystals are greater than 99.999999 percent pure.

5. The device of claim 1 wherein the internally strained semiconducting nanocrystals are selected from the group including silicon and germanium.

6. The device of claim 1, wherein the layer of internally strained semiconducting nanocrystals is 1 cm² and generates a voltage with a power of between about 0.1 V and about 18 V and a shorted current of between about 10 μA and about 50 mA.

7. The device of claim 1 further comprising an array of ZnO nanowires deposited onto the layer of internally strained semiconducting nanocrystals.

8. The device of claim 1, wherein the respective internally strained semiconducting nanocrystals are intercalated with lithium.

9. The device of claim 1 wherein the energy density is at least 1000 MJ/Kg.

10. An electrically transductive device comprising
a substrate having an electrically conducting surface portion;
a first film of semiconducting nanoparticles positioned on the electrically conducting portion and further comprising
a first plurality of close-packed first generally spherical semiconducting nanoparticles defining a first plurality of interstices; and
a second plurality of second, smaller generally spherical semiconducting nanoparticles filling the plurality of interstices; and
a first coating of electrically conductive metal deposited over the first film.

11. The electrically transductive device of claim 10 further comprising
a second film of semiconducting nanoparticles positioned on the electrically conductive first coating; and
a second coating of electrically conductive metal deposited over the second coating.

12. The electrically transductive device of claim 10, wherein the semiconducting nanoparticles are selected from the group including high purity silicon, high purity germanium, doped P-type silicon, doped N-type silicon, doped P-type germanium, doped N-type germanium, and mixtures thereof.

13. The electrically transductive device of claim 10, wherein the substrate is selected from the group including glass and plastic and wherein the electrically conducting portion is indium tin oxide.

14. The electrically transductive device of claim 10 wherein the substrate and electrically conducting portion are both transparent.

15. The electrically transductive device of claim 10 wherein the semiconducting nanoparticles are intercalated with lithium.

16. The electrically transductive device of claim 10 wherein the semiconducting nanoparticles are piezoelectric.

17. The electrically transductive device of claim 10 wherein the energy density is at least about 1000 MJ/Kg.

18. An electromechanical device comprising
a substrate having an electrically conductive surface;
a film of piezoelectric silicon, germanium, or silicon-germanium nanoparticles composed of a multimodal size distribution of the piezoelectric nanoparticles positioned in electric communication with the electrically conductive surface, wherein the multimodal size distribution includes a first mode of larger piezoelectric nanoparticles defining a plurality of interstices and a second mode of smaller piezoelectric nanoparticles filling the plurality of interstices; and
an electrically conducting metal layer positioned opposite the electrically conducting surface and in electric communication with the film of piezoelectric nanoparticles.

19. The electromechanical device of claim 18, wherein
the piezoelectric nanoparticles are generally spherical;
the piezoelectric nanoparticles have diameters between about 2 and about 50 nanometers; and
the film is between about 500 nanometers and about 800 nanometers thick.

20. The electromechanical device of claim 18, wherein the film further comprises
a first plurality of generally spherical piezoelectric nanoparticles with diameters between 8 nanometers and 10 nanometers; and
a second plurality of generally spherical nanoparticles with diameters between 24 nanometers and 26 nanometers.

21. The electromechanical device of claim 18, wherein more than 95 percent of the particles defining each respective mode of the multimodal size distribution are within 2 nanometers of the respective mode.

22. The electromechanical device of claim 18 wherein the piezoelectric nanoparticles are strained through intercalation.

23. The electromechanical device of claim 18 wherein the energy density is at least about 1000 MJ/kg.

* * * * *